(12) United States Patent
Dong et al.

(10) Patent No.: US 11,534,758 B2
(45) Date of Patent: Dec. 27, 2022

(54) MICRO TOTAL ANALYSIS SYSTEM AND METHOD

(71) Applicant: BOE TECHNOLOGY GROUP CO., LTD., Beijing (CN)

(72) Inventors: Xue Dong, Beijing (CN); Yanling Han, Beijing (CN); Haisheng Wang, Beijing (CN); Chuncheng Che, Beijing (CN); Xiaoliang Ding, Beijing (CN); Yingming Liu, Beijing (CN); Yuzhen Guo, Beijing (CN); Wanxian Xu, Beijing (CN); Peizhi Cai, Beijing (CN); Haochen Cui, Beijing (CN); Fengchun Pang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 174 days.

(21) Appl. No.: 16/624,016

(22) PCT Filed: Aug. 16, 2018

(86) PCT No.: PCT/CN2018/100834
§ 371 (c)(1),
(2) Date: Dec. 18, 2019

(87) PCT Pub. No.: WO2019/047702
PCT Pub. Date: Mar. 14, 2019

(65) Prior Publication Data
US 2020/0108387 A1    Apr. 9, 2020

(30) Foreign Application Priority Data

Sep. 6, 2017   (CN) .......................... 201710797437.6

(51) Int. Cl.
*B01L 3/00* (2006.01)
*G01N 21/64* (2006.01)
*G01N 27/22* (2006.01)

(52) U.S. Cl.
CPC ...... *B01L 3/502715* (2013.01); *G01N 21/645* (2013.01); *G01N 27/226* (2013.01);
(Continued)

(58) Field of Classification Search
CPC .. B01L 3/502715; B01L 3/5027; B01L 3/502; B01L 3/50; B01L 2300/06;
(Continued)

(56) References Cited

U.S. PATENT DOCUMENTS

| 9,239,328 B2 | 1/2016 | Chang et al. |
| 9,254,485 B2 | 2/2016 | Chang et al. |

(Continued)

FOREIGN PATENT DOCUMENTS

| CN | 1514012 A | 7/2004 |
| CN | 1635146 A | 7/2005 |

(Continued)

OTHER PUBLICATIONS

Vijay Srinivasan, et al; "An integrated digital microfluidic lab-on-a-chip for clinical diagnostics on human physiological fluids", Lab on a Chip Journal; Issue 4, May 25, 2004, 6 pages.
(Continued)

*Primary Examiner* — Christine T Mui (57) ABSTRACT

A micro-total analysis system and a method thereof are provided. The micro-total analysis system includes: a microfluidic device, configured to accommodate a liquid to be detected; an optical unit, configured to form a first light irradiated to the microfluidic device; and a detection unit, configured to detect the liquid to be detected and output a detection signal to obtain detection information.

20 Claims, 8 Drawing Sheets

(52) U.S. Cl.
CPC ... *B01L 2300/06* (2013.01); *B01L 2300/0627* (2013.01); *B01L 2300/0645* (2013.01); *B01L 2400/0475* (2013.01)

(58) Field of Classification Search
CPC ..... B01L 2300/0627; B01L 2300/0645; B01L 2400/0475; G01N 21/645; G01N 21/64; G01N 21/63; G01N 21/62; G01N 27/226; G01N 27/22; G01N 27/02
USPC ...................................................... 422/82.08
See application file for complete search history.

(56) References Cited

U.S. PATENT DOCUMENTS

| | | | |
|---|---|---|---|
| 10,119,915 B2 | 11/2018 | Tu et al. | |
| 2008/0121045 A1 | 5/2008 | Cole et al. | |
| 2011/0118132 A1* | 5/2011 | Winger | C12Q 1/00 506/7 |
| 2014/0262783 A1* | 9/2014 | Chang | B01F 13/0071 204/452 |
| 2015/0146203 A1 | 5/2015 | Lai et al. | |
| 2017/0076676 A1 | 3/2017 | Hadwen | |
| 2019/0366333 A1 | 12/2019 | Zhou et al. | |
| 2020/0108387 A1 | 4/2020 | Dong et al. | |

FOREIGN PATENT DOCUMENTS

| | | |
|---|---|---|
| CN | 201016979 Y | 2/2008 |
| CN | 102306652 A | 1/2012 |
| CN | 102932609 A | 2/2013 |
| CN | 103865789 A | 6/2014 |
| CN | 104048919 A | 9/2014 |
| CN | 105642376 A | 6/2016 |
| CN | 106053402 A | 10/2016 |
| CN | 106933142 A | 7/2017 |
| CN | 107607475 A | 1/2018 |

OTHER PUBLICATIONS

Xize Niu, et al; "Real-time detection, control, and sorting of microfluidic droplets", Biomicrofluidics Dec. 2007; 1(4); Published online Oct. 3, 2007, 13 pages.

International Search Report and Written Opinion dated Oct. 26, 2018; PCT/CN2018/100834.

The First Chinese Office Action dated Feb. 22, 2019; Appln. No. 201710797437.6.

* cited by examiner

MICRO TOTAL ANALYSIS SYSTEM AND METHOD

The application claims priority to Chinese patent application No. 201710797437.6 filed on Sep. 6, 2017, the entire disclosure of which is incorporated herein by reference as part of the present application.

TECHNICAL FIELD

At least one embodiment of the present disclosure relates to a micro-total analysis system and a method thereof.

BACKGROUND

A micro-total analysis system (μTAS) aims to maximize the transfer of functions of an analytical laboratory to a portable analytical apparatus and even into a square-inch-sized chip through miniaturization and integration of a chemical analysis apparatus. An ultimate goal of the micro-total analysis system is to realize the "personalization" and "home-use" of the analytical laboratory, which frees analytical science and analytical instruments from the chemical laboratory and enters thousands of households.

SUMMARY

At least an example of the present disclosure relates a micro-total analysis system (μTAS) and a method thereof. The micro-total analysis system has a high degree of integration and can realize operation and detection of the liquid to be detected and/or components of the liquid.

At least an example of the present disclosure provides a micro-total analysis system, comprising: a microfluidic device, configured to accommodate a liquid to be detected; an optical unit, configured to form a first light irradiated to the microfluidic device; and a detection unit, configured to detect the liquid to be detected and output a detection signal to obtain detection information.

According to a micro-total analysis system provided by some examples of the present disclosure, the microfluidic device comprises a first base substrate and a second base substrate opposite to each other, the detection unit is located on a side of the first base substrate close to the second base substrate or on a side of the first base substrate away from the second base substrate, and the optical unit is located on a side of the second base substrate away from the first base substrate.

According to a micro-total analysis system provided by some examples of the present disclosure, the microfluidic device comprises a first electrode located on the side of the first base substrate close to the second base substrate, and a second electrode located on a side of the second base substrate close to the first base substrate, the first electrode comprises a plurality of first sub-electrodes insulated from each other, each of the plurality of first sub-electrodes is connected with a first thin film transistor, and a space between the first base substrate and second base substrate is configured to accommodate the liquid to be detected.

According to a micro-total analysis system provided by some examples of the present disclosure, the optical unit comprises a light source, a light guide plate, and a grating, the light guide plate is disposed opposite to the second base substrate, the light source is located on a side surface of the light guide plate, the grating is located on a side of the light guide plate close to the first base substrate, the light source is configured to emit a second light, the light guide plate is configured to transmit the second light, and the grating is configured to adjust the second light transmitted from the light guide plate to the first light, and emit the first light toward the microfluidic device.

According to a micro-total analysis system provided by some examples of the present disclosure, the light source comprises a laser light source.

According to a micro-total analysis system provided by some examples of the present disclosure, the grating comprises a first grating portion and a second grating portion, the first grating portion and the second grating portion are configured to form the first light being different in feature, and the feature comprises at least one of wavelength and intensity.

According to a micro-total analysis system provided by some examples of the present disclosure, the second base substrate is also taken as the light guide plate.

According to a micro-total analysis system provided by some examples of the present disclosure, the detection unit is located on a side of the first base substrate close to the second base substrate.

According to a micro-total analysis system provided by some examples of the present disclosure, the detection unit comprises a sensor group.

According to a micro-total analysis system provided by some examples of the present disclosure, the sensor group comprises an optical sensor, the optical sensor is configured to detect a third light, and the third light is a light transmitted to the optical sensor after the first light passing through the liquid to be detected.

According to a micro-total analysis system provided by some examples of the present disclosure, the third light is a fluorescence emitted by the liquid to be detected under the excitation of the first light.

According to a micro-total analysis system provided by some examples of the present disclosure, the sensor group comprises a plurality of second thin film transistors and a plurality of photosensitive diodes, each of the plurality of photosensitive diodes is respectively connected with one of the plurality of second thin film transistors, the plurality of second thin film transistors are arranged in an array, second thin film transistors in a same row are connected to a same gate line, and second thin film transistors in a same column are connected to a same data line.

According to a micro-total analysis system provided by some examples of the present disclosure, the sensor group comprises a capacitive sensor; the microfluidic device comprises a first electrode disposed on the first base substrate, and a second electrode disposed on the second base substrate, the second electrode is insulated from the first electrode, the first electrode and the second electrode are configured to drive the liquid to be detected in a first period, and configured to output a capacitance signal between the first electrode and the second electrode in a second period, and the first electrode and the second electrode constitute the capacitive sensor.

According to a micro-total analysis system provided by some examples of the present disclosure, the first electrode comprises a plurality of sub-potions insulated from each other, each of the plurality of sub-portions comprises a plurality of first sub-electrodes insulated from each other, each of the plurality of first sub-electrodes is connected with a first thin film transistor, the second electrode comprises a plurality of second sub-electrodes insulated from each other, and each of the second sub-electrodes and a corresponding one of the sub-portions have an overlapping portion in a direction perpendicular to the first base substrate.

According to a micro-total analysis system provided by some examples of the present disclosure, the sensor group comprises at least two different types of sensors, a same type of sensors comprises a plurality of sensors, and the plurality of sensors of the same type are arranged uniformly.

At least an example of the present disclosure provides a micro-total analysis method, comprising: accommodating a liquid to be detected in a microfluidic device; forming a first light irradiated to the microfluidic device; and detecting the liquid to be detected and outputting a detection signal to obtain detection information.

According to a micro-total analysis method provided by some examples of the present disclosure, the liquid to be detected generates fluorescence under excitation of the first light, and the detection unit is irradiated with the fluorescence and outputs the detection signal according to the fluorescence.

According to a micro-total analysis method provided by some examples of the present disclosure, the microfluidic device comprises a first electrode on a side of a first base substrate close to a second base substrate and a second electrode disposed on a side of the second base substrate close to the first base substrate, the second electrode is insulated from the first electrode, the first base substrate and the second base substrate are opposite to each other, driving and capacitance detection are performed in a time-division mode, and the micro-total analysis method comprises: driving the liquid to move by using the first electrode and the second electrode in a first period; and outputting a capacitance signal between the first electrode and the second electrode in a second period.

According to a micro-total analysis method provided by some examples of the present disclosure, in the first period, a common signal is input to the second electrode and a first driving signal is input to the first electrode, and the micro-total analysis method further comprises adjusting the first driving signal in real time based on a result of the capacitance detection.

A micro-total analysis method provided by some examples of the present disclosure comprises a plurality of time spans, each of the plurality of time spans comprises the first period and the second period, and the first driving signal input to the first electrode in a subsequent time span is adjusted in real time according to the result of the capacitance detection in a previous time span that before the subsequent time span.

BRIEF DESCRIPTION OF THE DRAWINGS

In order to clearly illustrate the technical solution of the embodiments of the present disclosure, the drawings of the embodiments will be briefly described in the following. It is obvious that the described drawings in the following are only related to some embodiments of the present disclosure and thus are not limitative of the present disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", "coupled", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

A microfluidic device or a microfluidic chip is the current hotspot in a micro-total analysis system (μTAS), and the microfluidic device or the microfluidic chip best embodies the idea of transferring functions of an analytical laboratory to a chip.

The conventional microfluidic chip is designed for a specific application, with a single function, thus only used for transporting, separating and combining droplets or other operations. A complete test system may be constituted together with a microscope system, a light source system, an operating environment detection system, or the like.

Figure 1:
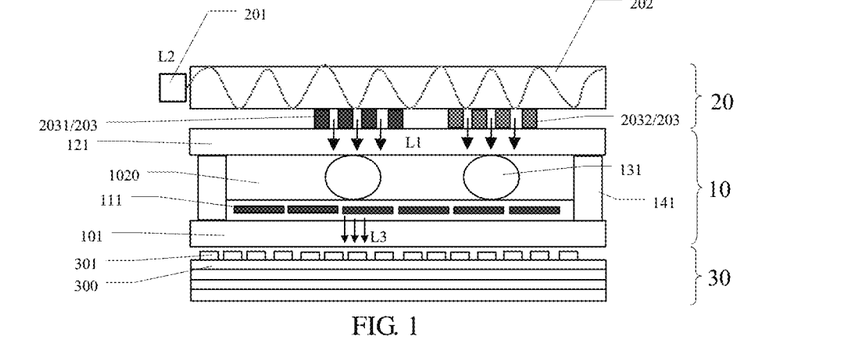
FIG. 1 is a sectional view of a micro-total analysis system according to an example of the present disclosure.

As shown in FIG. 1, at least an example of the present disclosure provides a micro-total analysis system, including a microfluidic device 10, an optical unit 20, and a detection unit 30. The microfluidic device 10 is configured to accommodate a liquid 131 to be detected. The optical unit 20 is configured to form a first light L1 irradiated to the microfluidic device 10. For example, the first light L1 is irradiated onto the liquid 131 to be detected in the microfluidic device 10. The detection unit 30 is configured to detect the liquid 131 to be detected and output a detection signal to obtain detection information. The detection signal may include, for example, a voltage signal and/or a current signal.

The micro-total analysis system/detection platform provided by at least an example of the present disclosure has a high degree of integration and intelligence, can not only perform operations such as movement (transportation), separation and combination, and reaction of liquid/liquid 131 to be detected, but also to implement the detection of the liquid 131 to be detected, and has a small size and is operated flexibly and conveniently. For example, the liquid can be passed into the microfluidic device, and the liquid 131 to be detected may be a liquid obtained after the liquid passed into the microfluidic device and reacted therein, and the examples of the present disclosure are not limited thereto.

For example, the first light L1 is irradiated to the liquid 131 to be detected in the microfluidic device 10, a third light L3 is obtained after the first light L1 transmits through the liquid 131 to be detected, and the third light L3 is irradiated to the detection unit 30. For example, the detection information of the liquid to be detected can be obtained by the information of the third light L3 detected by the detection unit 30, such as a light intensity, brightness, or the like. For example, the detection information includes at least one of whether the liquid 131 to be detected reacts, a degree of reaction, a substance to be detected therein, a content of the substance to be detected, or the like. For example, a light passing through the portion where there is a droplet and a light passing through the portion without a droplet have different intensities and/or brightness, so that the detection information such as the size and position of the droplet can be obtained.

For example, the micro-total analysis system provided by at least one example of the present disclosure can be applied to fields of biology, medicine, chemistry, or the like to complete parallel experiments and detections, for example, a droplet of blood to be detected is separated into several sub-droplets, and then transported to different positions for simultaneous reaction, different items detected at a same time. The system avoids the construction of a large and complicated experimental system, has a high experiment reproducibility and reduces experiment difficulties. The micro-total analysis system provided by the example of the present disclosure can be used for detection and calibration in physical, biological and chemical fields, such as spectral detection, substance analysis, calibration, molecular diagnostics, food quarantine, bacteria classification, or the like.

For example, the liquid passing through the microfluidic device 10 may be a droplet, a fluid, or the like. Hereinafter, a droplet will be described as an example.

As shown in FIG. 1, in order to facilitate the irradiation of the first light L1 to the liquid 131 to be detected and the detection of the detection unit, in one example, the microfluidic device 10 is provided between the optical unit 20 and the detection unit 30. For example, the first light L1 may be a laser light or a collimated light, but is not limited thereto.

As shown in FIG. 1, in order to facilitate the integration of the microfluidic device 10, the optical unit 20, and the detection unit 30, in one example, the microfluidic device 10 includes a first base substrate 101 and a second base substrate 121 that are disposed opposite to each other. A space 1020 between the first base substrate 101 and the second base substrate 121 is configured to accommodate the liquid 131 to be detected. The detection unit 30 is located on a side of the first base substrate 101 away from the second base substrate 121, and the optical unit 20 is located on a side of the second base substrate 121 away from the first base substrate 101. For example, the liquid 131 to be detected is disposed between the first base substrate 101 and the second base substrate 121. Materials of the first base substrate 101 and the second base substrates 121 include glass. The first base substrate 101 and the second base substrates 121 are not limited to glass, and may be other substrates. A glass-based highly integrated system avoids expensive experimental instruments, improves portability, and reduces experiment costs.

As shown in FIG. 1, in one example, the optical unit 20 includes a light source 201, a light guide plate 202, and a grating 203. The light guide plate 202 is disposed opposite to the second base substrate 121. The light source 201 is located on a side surface of the light guide plate 202, and the grating 203 is located on a side of the light guide plate 202 close to the first base substrate 101. The light source 201 is configured to emit a second light L2, the light guide plate 202 is configured to transmit the second light L2, the grating 203 is configured to adjust the second light L2 transmitted from the light guide plate 202 to the first light L1, and the first light L1 is emitted toward the microfluidic device 10. For example, the light source is processed by the light guide plate 202 and the grating 203 to emit light with different requirements. For example, the light may be led out at the light guide plate 202 where the grating 202 is disposed, and a total reflection may be formed at the remaining positions.

For example, with the gratings designed differently, the optical unit 20 adjusts light with different wavelengths and different intensities to irradiate the liquid/droplet in the middle microfluidic device or the lower detection unit (for example, a photosensitive sensor of a sensor group). Different gratings can form different light, such that droplets react differently. The grating may be designed as an optical path collimator to improve an irradiation accuracy of the light. The optical unit is integrated to achieve the functions of a spectrometer, a spectrograph, detection light source, or the like.

For example, the light source on one side of the optical unit may be a laser light source, the laser is emitted to the light guide plate, and then lasers of different wavelengths are emitted from the corresponding positions through the gratings which are designed differently at different positions on the light guide plate. The advantage is that using only one laser light source implements the requirements of different laser light sources, and reduces the power consumption. Different sub-droplets are used in different detection items to correspond to different fluorescence detections, saving a light filter which detects one droplet using multiple fluorescences.

As shown in FIG. 1, in order to meet testing requirements of the first light L1 with different features (such as a wavelength and/or intensity), in one example, the grating 203 may include a first grating portion 2031 and a second grating portion 2032 which are configured to form the first light L1 with different wavelengths. It should be noted that the grating 203 may include a plurality of grating portions to form more first light with different wavelengths, and the number of the grating portions is not limited to two. For example, the grating 203 may include four grating portions, such that the first light L1 with four different wavelengths may be formed. In the example of the present disclosure, the first light L1 may also have only one wavelength, and the required feature of the first light L1 may be determined based on the detection requirements.

For example, the light source 201 may be a point light source, a surface light source, or a combination of a plurality of point light sources. The light guide plate 202 may be made of glass or other materials. For example, the grating may adopt a holographic grating/micro/nano lens, and may include a horizontal structure and a vertical structure, which can adjust the irradiation direction of the light and control the wavelength of transmitted light. For example, the grating may also be of a planar microstructure, which mainly adjusts the optical path. For example, the grating may be made of a holographic material by an exposure process. The grating structure is not limited in the example of the present disclosure, as long as it may function to adjust the light path and/or the wavelength of the light.

For example, as shown in FIG. 1, the detection unit 30 may include a plurality of detection portions 301, and the plurality of detection portions 301 may be disposed on the third base substrate 300.

Figure 2:
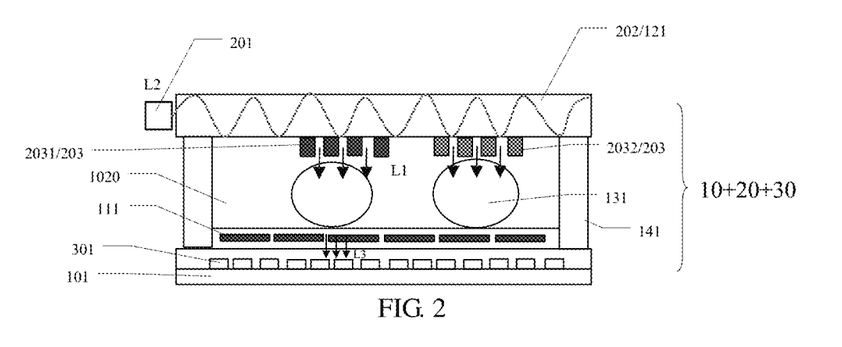
FIG. 2 is a sectional view of a micro-total analysis system according to another example of the present disclosure.

For example, the optical unit 20 may be separated or integrally fabricated on the microfluidic device 10. For example, as shown in FIG. 2, the optical unit 20 is fabricated in the second base substrate 121 of the microfluidic device 10. As shown in FIG. 2, the detection unit 30 (the plurality of detection portions 301) may be separately fabricated on the microfluidic device 10.

As shown in FIG. 2, in order to facilitate the integration of the microfluidic device 10, the optical unit 20, and the detection unit 30, in one example, the microfluidic device 10 includes a first base substrate 101 and a second base substrate 121 that are disposed opposite to each other. The detection unit (the plurality of detection portions 301) is located on a side of the first base substrate 101 close to the second base substrate 121. The second base substrate 121 also serves as the light guide plate 202 of the optical unit 20, and the second base substrate 121 is taken as the light guide plate 202 of the optical unit 20. That is, the second base substrate 121 and the light guide plate 202 are integrated with each other. Thus, the components may be integrated on two base substrates to reduce a thickness of the micro-total analysis system. The examples of the present disclosure are not limited thereto.

For example, for the experiments which may pollute the microfluidic device, the micro-total analysis system may be modularly designed to replace only the middle microfluidic device, further reducing costs.

An electrowetting on dielectric (EWOD) microfluidic device will be described as an example. A digital microfluidic technology based on EWOD refers to such a technology that a contact angle of the droplet on an insulating medium may be changed by applying a voltage signal on the chip with the insulating medium, causing the droplet to deform asymmetrically, thereby generating an internal force to operate the droplet. Due to many advantages of simple implementation, convenient operation, good controllability, and high driving capability, this technology is receiving more and more attention and is considered to be the most promising technology in the field of microfluidics. It should be noted that the type of the microfluidic device 10 is not limited in the example of the present disclosure.

Figure 3:
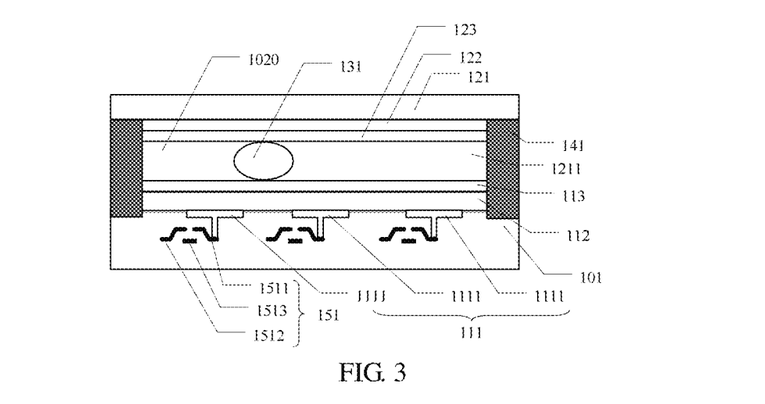
FIG. 3 is a sectional view of a microfluidic device of a micro-total analysis system according to an example of the present disclosure.

As shown in FIG. 3, in one example, the microfluidic device 10 is an electrowetting microfluidic device, including a first electrode 111 disposed on the first base substrate 101 and a second electrode 122 disposed on the second base substrate 121. An electric field may be formed between the second electrode 122 and the first electrode 111, and the formed electric field may operate the liquid 131 to be detected. The first electrode 111 includes a plurality of first sub-electrodes 1111 insulated from each other, and each of the plurality of first sub-electrodes 1111 is connected with a first thin film transistor (TFT) 151. For example, the second electrode 122 may be a planar (entire surface) electrode. For example, the first TFT 151 may include a first drain electrode 1511, a first source electrode 1512, and a first gate electrode 1513.

For example, in a case where the optical unit 20 is integrated in the microfluidic device 10, the grating 203 and the second electrode 122 may be disposed on the second base substrate 121. The grating 203 and the second electrode 122 may be disposed on a same surface of the second base substrate 121 or two opposite surfaces of the second base substrate 121.

For example, in the microfluidic device 10, the first electrode 111 and the second electrode 122 may be made of a transparent conductive material, such as indium tin oxide (ITO), to avoid shielding light. A liquid driving and detection circuit may be fabricated in the microfluidic device 10 or the detection unit 30.

For example, a second hydrophobic layer 123 may be formed on the second electrode 122, and an insulating layer 112 and a first hydrophobic layer 113 may be formed on the first electrode 111.

For example, the electrowetting microfluidic device may be fabricated as follows.

(1) The entire surface of the second electrode 122 is deposited on the second base substrate 121. It may be deposited by plasma enhanced chemical vapor deposition, and the second electrode is a transparent electrode, such as an ITO electrode.

(2) The second hydrophobic layer 123 is fabricated on the second electrode 122.

(3) The first TFT 151 and the first electrode 111 (a driving electrode array) are formed on the first base substrate 101.

(4) The entire surface of the dielectric insulating layer 112 is deposited on the first electrode 111. The dielectric insulating layer may be, for example, SiNx, SiOx or the like.

(5) The first hydrophobic layer 113 is fabricated on the insulating layer 112. The first hydrophobic layer 113 may be a hydrophobic material for the entire surface.

For example, the first hydrophobic layer 113 and the second hydrophobic layer 123 may be applied by a spin-coating process, or a layer of substance, e.g. SiF, is deposited firstly, and then is bombarded by a plasma to generate a low surface energy hydrophobic material. The material and fabricating process of the hydrophobic layer are not limited in the examples of the present disclosure.

For example, as shown in FIG. 3, the first base substrate 101 and the second base substrate 121 are oppositely arranged to form a cell 1211, in which a liquid/droplet may move. For example, the first base substrate 101 and the second base substrate 121 may be bonded by a sealant 141, but not limited thereto. For example, a partition wall may also be made to limit the position of the liquid/droplet.

In one example, the detection unit 30 includes a sensor group, but not limited thereto. For example, the sensor group includes at least one of an optical sensor, a capacitive sensor, a temperature sensor, and an ultrasonic sensor. For example, the detection unit 30 (the sensor group) may be separated or integrated. To facilitate the detection, some sensors of the detection unit 30 may be integrated in the base substrate of the microfluidic device. Similarly, a control circuit of the microfluidic device may also be integrally fabricated in the detection unit. For example, the sensor group may perform various detections, such as position detection, temperature detection, optical detection, or the like. For example, the detection unit 30 may also perform detection using technologies such as CCD/CMOS/photomultiplier, or the like.

The optical sensor performs detection by irradiating a photosensitive diode with the light having different light intensities to generate different light currents. The position, shape, volume, or the like of the droplet can be detected by irradiating the photosensitive diode using the light path confined by the light guide plate. The content of different test items may be detected by irradiating the photosensitive diode using fluorescence emitted from a marker in a target cell. For example, the information of the liquid to be detected may be detected, such as composition, content, position, shape, or the like.

Figure 4:
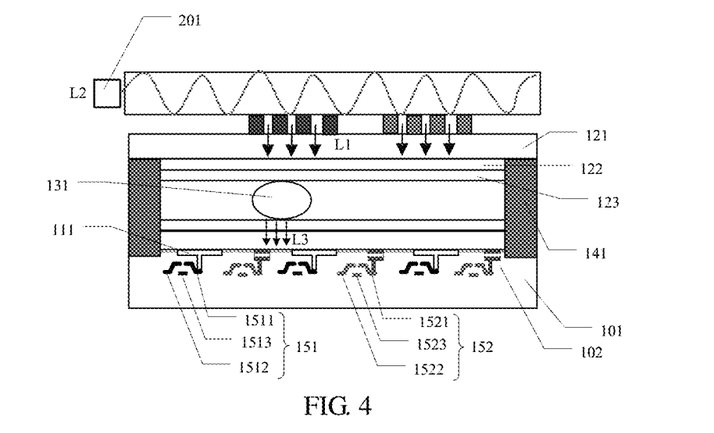
FIG. 4 is a sectional view of a micro-total analysis system according to another example of the present disclosure.

As shown in FIG. 4, in one example, the sensor group includes an optical sensor which is configured to detect a third light L3. For example, the third light L3 is the light which is transmitted to the optical sensor after the first light L1 passing through the liquid 131 to be detected. For example, the third light L3 is the light emitted by the liquid 131 to be detected under the excitation of the first light L1. For example, the third light L3 is the light emitted by the marker carried by the reaction of the target cell and the marked cell in the liquid 131 to be detected under the excitation of the first light L1. For example, the third light L3 may be a fluorescence, but not limited thereto. The third light L3 may also be a light with partial light loss after the first light L1 irradiates to the detection unit 30 through the microfluidic device 10. The light loss may include, for example, intensity attenuation, etc., and the detection signal may be output by detecting the light loss. For example, the information of the liquid/droplet to be detected, such as position, shape, or the like may be obtained by using this type of light with partial light loss.

For example, taking a genetic testing as an example, the micro-total analysis system according to one example works as follows. The droplet to be detected in the microfluidic device 10 is divided into several sub-droplets to be transported to different positions. The target cells in the sub-droplets react with the marked cells at the corresponding positions, carrying the marker, such as luciferase or the like. The marker emits different fluorescent photons under the excitation of lasers with different wavelengths. The fluorescence is irradiated on the photoelectric sensor (e.g., a photosensitive diode) to generate a voltage/current signal with a corresponding magnitude, thereby meeting different detection requirements at different positions. The detections with different requirements may be performed in parallel.

As shown in FIG. 4, in one example, the sensor group includes a plurality of second TFTs 152 and a plurality of photosensitive diodes 102. Each of the plurality of photosensitive diodes 102 is respectively connected with one of the plurality of second TFTs 152. For example, the second TFT 152 may include a second drain electrode 1521, a second source electrode 1522, and a second gate electrode 1523. The first TFT 151, the first electrode 111 and the sensor group may be integrated on the first base substrate 101. For example, the photosensitive diode 102 may include a first photosensitive electrode, a photosensitive material layer, and a second photosensitive electrode, but not limited thereto. For example, a PIN diode may be formed, but not limited thereto. The first photosensitive electrode may be electrically connected with the second drain electrode 1521 of the second TFT 152. For example, different photosensitive diodes 102 may be arranged at different positions. For example, different light conversion rates can be realized by adjusting at least one of photosensitive material, area and thickness of the photosensitive diode 102, such that different photosensitive diodes 102 are located at different positions.

FIG. 4 is a structural diagram of the detection by using the photosensitive diode. Each photosensitive sensor consists of one photosensitive diode and one second TFT. The light with different light intensity is irradiated to the photosensitive diode to generate the light current with different magnitude. Under control of the second TFT, a current difference of each photosensitive diode is read sequentially, such that the position of the droplet and the content of the detection item may be detected. Further, in order to improve the detection accuracy, the photosensitive diodes can be designed differently for different types of fluorescence at different positions to maximize a photoelectric conversion efficiency.

As shown in FIG. 4, in one example, the detection unit (the photosensitive diode 102) is located on the side of the first base substrate 101 close to the second base substrate 201.

Figure 5:
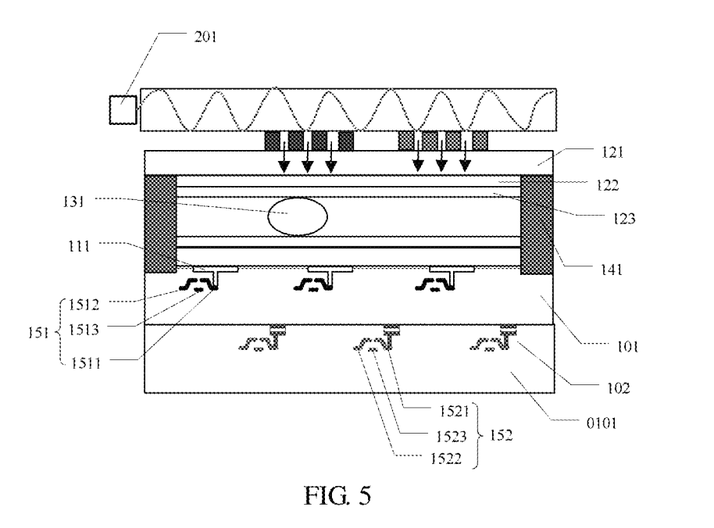
FIG. 5 a sectional view of a micro-total analysis system according to another example of the present disclosure.

As shown in FIG. 5, in one example, the sensor group may also be disposed on a fourth base substrate 0101.

Figure 6:
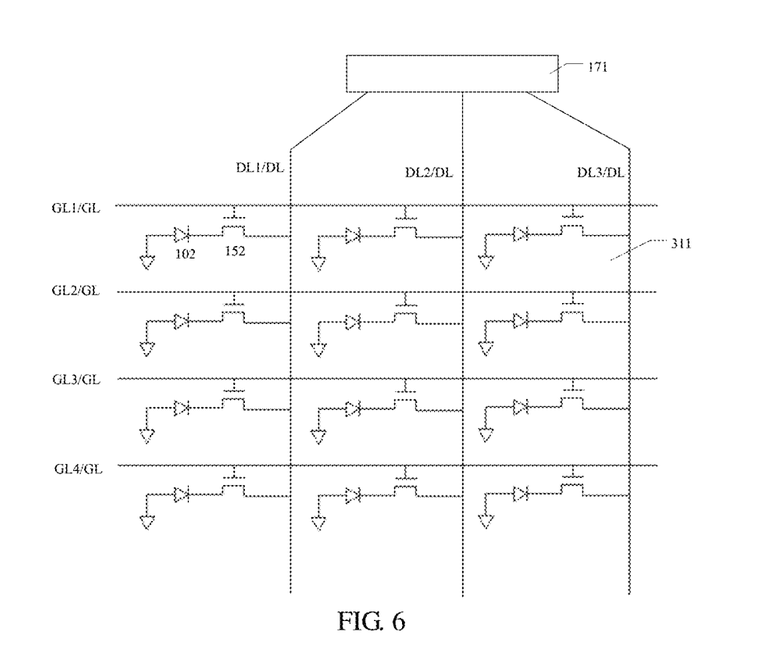
FIG. 6 is a schematic circuit diagram of a micro-total analysis system according to an example of the present disclosure.

As shown in FIG. 6, in one example, the plurality of second TFTs 152 may be arranged in an array, the second TFTs 152 in a same row are connected to a same first gate line (GL), and the second TFTs in a same column are connected to a same first data line (DL). FIG. 6 shows a total of four first gate lines GL1-GL4 and three first data lines DL1-DL3, the examples of the present disclosure are not limited thereto, and the number of first data lines DL and the number of first gate lines may be determined as needed. The second gate electrodes 1523 of the second TFTs 152 in the same row are connected to the same first gate line GL, and the first source electrodes 1521 of the second TFTs in the same column are connected to the same first data line DL.

For example, as shown in FIG. 6, the second gate electrodes of the second TFTs 152 in the same row may be electrically connected, and the second source electrodes of the second TFTs 152 in the same column may be electrically connected. Therefore, driving electrodes (driving electrodes of the photosensitive diodes) may be led out according to the entire row or column, thereby changing (m×n) electrode wires to (m+n) electrode wires, greatly reducing the number of lead-out wires, and enabling the position where the circuit is arranged not subject to this limitation.

For example, the first gate lines GL are scanned row by row, and data signals are input column by column, thereby individually controlling each photosensitive diode. For example, as shown in FIG. 6, the first gate lines GL and the first data lines DL are insulated from each other and intersect to form a plurality of first detection sub-units 311. The first detection sub-units 311 in m rows and n columns are taken as an example. Providing the second TFTs 152 to change (m×n) electrode wires to (m+n) electrode wires greatly reduces the number of lead-out wires.

As shown in FIG. 6, each of the first data lines DL may be electrically connected to a first detection circuit 171. The first detection circuit 171 may be, for example, a detection integrated circuit (IC). For example, each of the first data lines DL may be connected to one of different pins of the first detection circuit 171. For example, the detection signal of the photosensitive diode 102 may be transmitted to the first detection circuit 171 through the second TFT 152.

Figure 7:
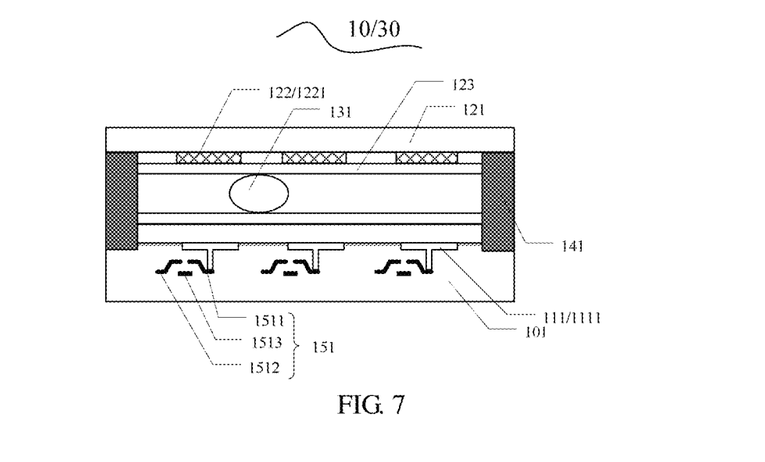
FIG. 7 is a sectional view of a microfluidic device/a capacitive sensor group in a micro-total analysis system according to an example of the present disclosure.

As shown in FIG. 7, in one example, a capacitive sensor may also be integrated in the microfluidic device 10.

As shown in FIG. 7, the microfluidic device 10 includes a first electrode 111 disposed on the first base substrate 101 and a second electrode 122 disposed on the second base substrate 121. The second electrode 122 is insulated from the first electrode 111, and the first electrode 111 and the second electrode 122 are configured to drive the liquid 131 to be detected in a first period, and configured to output the detection signal (a capacitance signal) between the first electrode 111 and the second electrode 122 in a second period. The first electrode 111 and the second electrode 122 constitute the capacitive sensor. The detection signal (the capacitance signal) includes, for example, a voltage signal and/or a current signal. The capacitance signal refers to, for example, a signal which varies with an sensing capacitance between the first electrode 111 and the second electrode 122, such as a signal determined according to the magnitude of the sensing capacitance between the first electrode 111 and the second electrode 122.

An example of the present disclosure provides a micro-total analysis system which can drive liquid and detect capacitance in a time-division manner, and can obtain capacitance detection results in real time. As not only electrodes for driving the liquid 131 to be detected, but also the electrodes for capacitance detection, the first electrode 111 and the second electrode 122 are easy to manufacture, and are driven and detected simply.

Figure 8:
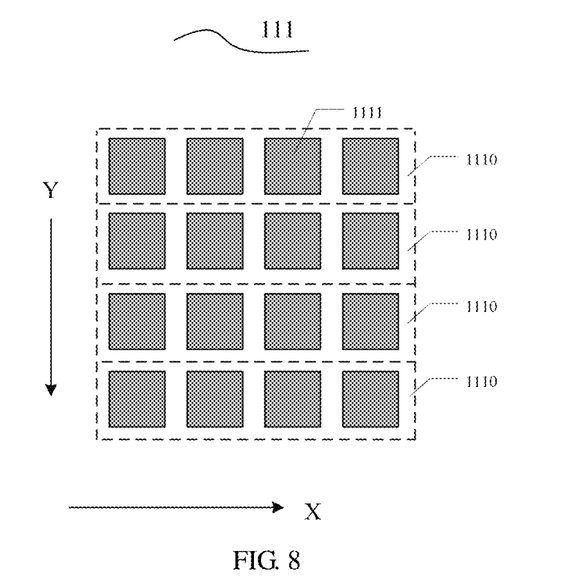
FIG. 8 is a top view of a first electrode of a microfluidic device/a capacitive sensor group in a micro-total analysis system according to an example of the present disclosure.

As shown in FIG. 8, in one example, the first electrode 111 includes a plurality of sub-portions 1110 insulated from each other, each of the plurality of sub-portions 1110 includes a plurality of first sub-electrodes 1111 insulated from each other, and each of the first sub-electrodes 1111 is connected with the first TFT 151. A first driving signal may be input to the first sub-electrode 1111 to control to operate the liquid/droplet to be detected.

Figure 9:
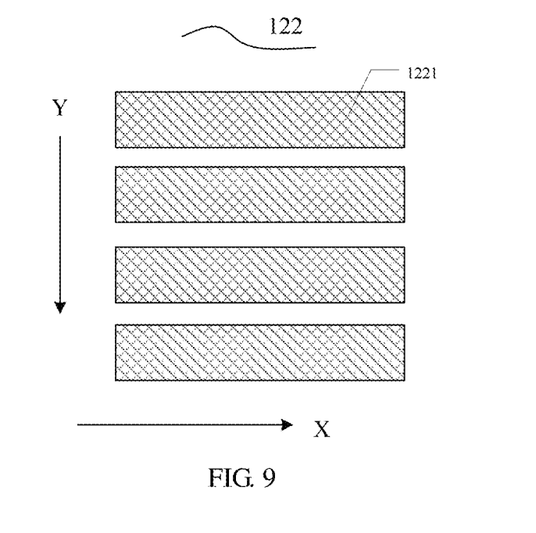
FIG. 9 is a top view of a second electrode of a microfluidic device/a capacitive sensor group in a micro-total analysis system according to an example of the present disclosure.

As shown in FIG. 9, in one example, the second electrode 122 includes a plurality of second sub-electrodes 1221 insulated from each other.

Figure 10A:
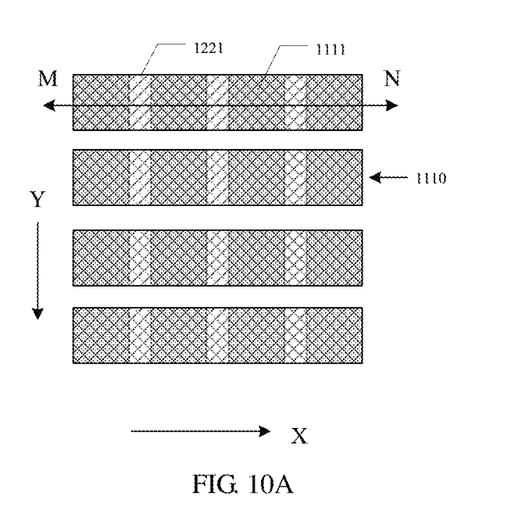
FIG. 10A is a top view of a first electrode and a second electrode of a microfluidic device/a capacitive sensor group in a micro-total analysis system according to an example of the present disclosure.

As shown in FIG. 10A, in one example, in order to facilitate the formation of an electric field and/or a capacitance, the second sub-electrode 1221 and the sub-portion 1110 have an overlapping portion in a direction perpendicular to the first base substrate 101. For example, an orthographic projection of the second sub-electrode 1221 on the first base substrate 101 and an orthographic projection of the sub-portion 1110 on the first base substrate 101 have an overlapping portion. FIG. 10A is a top view of the first electrode 111 and the second electrode 122 of the microfluidic device, i.e., the first electrode 111 and the second electrode 122 in a direction perpendicular to the first base substrate 101.

FIGS. 8-9 and FIG. 10A show a first direction X and a second direction Y. For example, the first direction X is a row direction, and the second direction Y is a column direction.

Figure 10B:
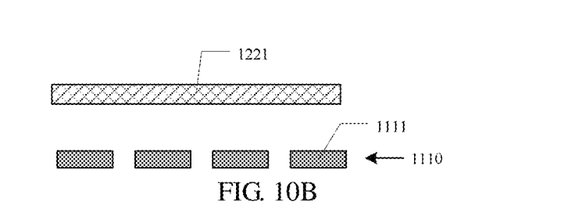
FIG. 10B is a top view of a first electrode and a second electrode of a microfluidic device/a capacitive sensor group in a micro-total analysis system according to another example of the present disclosure.

FIG. 10B is a sectional view of the first electrode 111 and the second electrode 122 at MN in FIG. 10A.

Figure 11A:
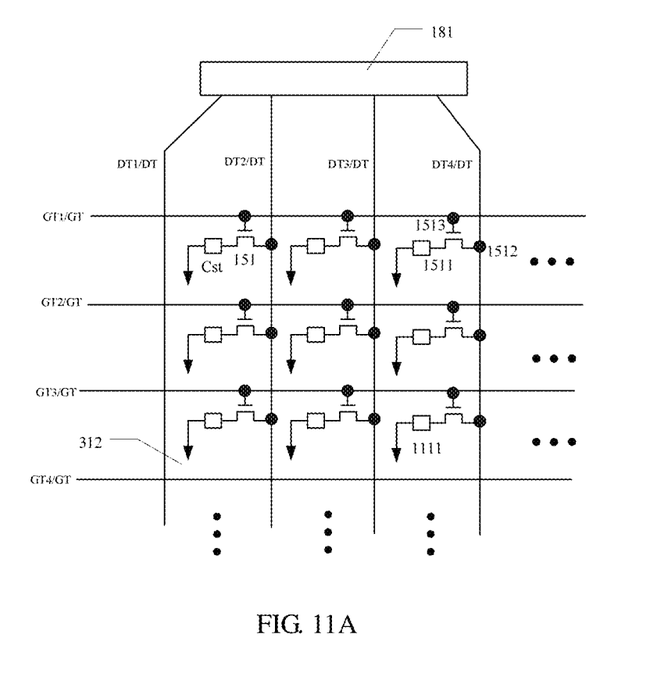
FIG. 11A is a schematic circuit diagram of a microfluidic device/a capacitive sensor group in a micro-total analysis system according to an example of the present disclosure.

As shown in FIG. 11A, in one example, a first thin film transistor (TFT) 151 (the first TFT 151, also referring to FIG. 7) is further included, and each of the first sub-electrodes 1111 is connected with the first TFT 151. For example, the first TFT 151 may include a first drain electrode 1511, a first source electrode 1512, and a first gate electrode 1513 (also referring to FIG. 7). The first drain electrode 1511 may be electrically connected with the first sub-electrode 1111. The first source electrode 1512 may be electrically connected with the second data line (DT). The first gate electrode 1513 may be electrically connected with the second gate line (GT). For example, the second gate line GT may be configured to input a gate signal to the first TFT 151, and the second data line DT may be configured to input a data signal to the first TFT 151. The second data line DT may also be configured to read out the detection signal. The detection signal may include, for example, a capacitive signal (e.g., a voltage/current signal).

As shown in FIG. 11A, for example, each of the first sub-electrodes 1111 and the second sub-electrode 1221 located over against the first sub-electrode 111 may produce a capacitance Cst, and the operation condition of the droplet can be obtained by detecting the magnitude of Cst. For example, one terminal of Cst is the second electrode 122 (the second sub-electrode 1221), the other terminal of Cst is the first electrode 111 (the first sub-electrode 1111), and the first electrode 111 can be connected to the second data line DT through the first TFT 151.

For example, the first gate electrodes 1513 of the first TFTs 151 in a same row may be electrically connected, and the first source electrodes 1512 of the first TFTs 151 in a same column may be electrically connected. For example, each of the second gate lines GT is scanned row by row, and the data signals are input column by column, thereby individually controlling each of the first sub-electrodes. For example, as shown in FIG. 11A, the second gate lines GT and the second data lines DT are insulated from each other and intersect to form a plurality of second detection sub-units 312. The second detection sub-units 312 in m rows and n columns are taken as an example. Providing the second TFTs 152 to change (m×n) electrode wires to (m+n) electrode wires greatly reduces the number of lead-out wires.

For example, as shown in FIG. 11A, in the device, the driving electrodes may be led out according to the entire row or column using the first TFTs, thereby changing the (m×n) electrode wires to (m+n) electrode wires, greatly reducing the number of lead-out wires, and enabling the position where the circuit is arranged not subject to this limitation. The first electrode 111/first sub-electrode 1111 may be taken as the driving electrode.

For example, as shown in FIG. 11A, the plurality of first TFTs 151 may be arranged in an array. For example, in order to reduce the number of lead-out wires, the plurality of first sub-electrodes 1111 included in each of the sub-portions are connected to a same second gate line GT through the first TFTs 151 connected with each of the first sub-electrodes 1111 respectively, and the first source electrodes 1511 of the TFTs connected to the first sub-electrodes 1111 in the same column are electrically connected with a same second data line DT.

For example, the TFTs 151 in a same row are connected to a same second gate line (GT), and the TFTs 151 in a same column are connected to a same second data line (DT). FIG. 11A shows four second gate lines GT1-GT4 and four second data lines DT1-DT4 in total, but the examples of the present disclosure are not limited thereto. The number of second data lines DT and the number of second gate lines GT may be determined as needed. The first gate electrodes 1513 of the first TFTs 151 in the same row are connected to the same second gate line GT, and the first source electrodes 1511 of the TFTs 151 in the same column are connected to the same second data line DT.

As shown in FIG. 11A, each of the second data lines DT may be electrically connected to a second detection circuit 181. The second detection circuit 181 may be, for example, a detection IC. For example, each of the second data lines DT may be connected to one of different pins of the second detection circuit 181.

As shown in FIG. 11A, the sensing capacitances may be read out one by one by TFT gating, and the sensing capacitance signals may be read out into the second detection circuit 181 through the second data lines DT. For example, the first detection circuit 171 and the second detection circuit 181 may be integrated together, but not limited thereto.

Figure 11B:
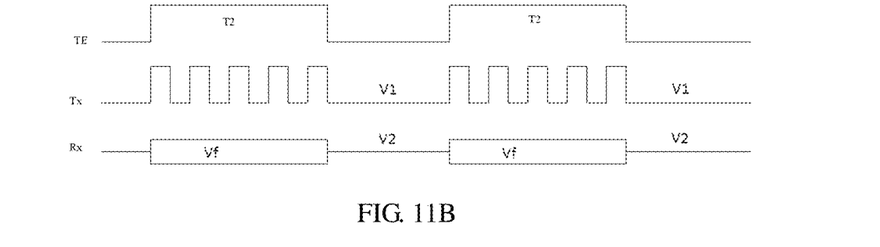
FIG. 11B is a driving timing of a microfluidic device/a capacitive sensor group in a micro-total analysis system according to an example of the present disclosure.

As shown in FIG. 11B, an example of the present disclosure provides a driving timing of the micro-total analysis system (microfluidic/micro-total analysis method), a mode of time-division driving is adopted, a time span TE includes a first period T1 and a second period T2, in which the first period T1 is a driving phase, and the second period T2 is a detecting phase. For example, the result of the droplet detection can be fed back to the second detection circuit (system processor) timely to detect the current driving effect, to judge whether the droplet achieves the desired driving effect and whether the first driving signal (driving voltage) is appropriate, and to adjust the driving voltage in real time based on the judge result, thereby achieving a better droplet control effect. In FIG. 11B, Tx refers to a driving electrode, Rx refers to a sensing electrode, and Vf refers to floating (Vf). For example, floating means no signal and no connection.

An example of the present disclosure provides a micro-total analysis/microfluidic method in which a common signal is input to the second electrode 122 and a first driving signal is input to the first electrode 111 in the first period. For example, the first driving signal may be a direct current signal or an alternating current signal (e.g., a square wave signal).

An example of the present disclosure provides a micro-total analysis/microfluidic method in which a second driving signal is input to the second electrode 122 and the first electrode 111 is floated in the second period. For example, the second driving signal may be a direct current signal or an alternating current signal (e.g., a square wave signal).

An example of the present disclosure provides a microfluidic method, and in order to control the liquid/droplet to be detected in real time, the microfluidic method further includes a step of adjusting the driving signal in real time based on a result of the capacitance detection.

For example, in a droplet driving phase (the first period T1), the second electrode 122 (all of the second sub-electrodes 1221) is provided with a common ground signal V1 (a reference voltage terminal), and the first sub-electrode 1111 is selected by the TFT as needed to provide the first driving signal V2 selectively. The function of the first driving signal V2 is to control the operations of moving, separating and combining droplets, or the like. The first driving signal V2 may be a DC signal or an AC square wave signal. For example, if the first driving signal V2 is a DC signal, the DC signal is required to be always supplied in the driving phase, and the power consumption is higher. For example, if the first driving signal V2 is an AC square wave, the voltage will be stored on CL (CL is an equivalent total capacitance of a dielectric layer between a upper sub-electrode and a lower sub-electrode, and the droplet) in a high-level phase, and the first TFT is turned off in a low-level phase. However, due to the leakage current of the first TFT, the stored voltage will leak bit by bit, resulting in a decrease in driving capability. Therefore, the adoption of the driving mode of the AC square wave not only saves power consumption but also ensure the driving effect. In addition, the AC signal driving helps to reduce contact angle hysteresis and surface ion adsorption, etc., and to achieve a better EWOD effect. For example, the first driving signal V2 (AC driving signal) has a frequency greater than a resonance frequency of the droplet and less than a charging frequency of the device, thereby obtaining a good electrowetting effect.

For example, in the droplet detecting phase (the second period T2), the second driving signal (for example, a square wave signal) may be input to the second electrode 122/second sub-electrode 1221, and the first sub-electrode 1111 is floating (Vf). The sensing capacitance is generated, and the magnitudes of the sensing capacitances at locations with the droplet and without the droplet are different. The sensing capacitance of the first sub-electrode 1111 is read out one by one through gating of the first TFT. For example, a positional shape diagram of the droplet can be obtained by the read-out sensing capacitance, and the information of the droplet, such as volume, size, or the like, may be calculated by a corresponding algorithm.

Figure 12A:
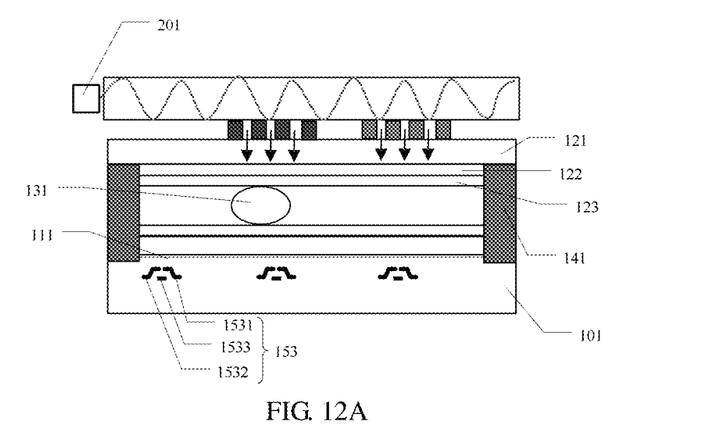
FIG. 12A is a sectional view of a micro-total analysis system according to another example of the present disclosure.

As shown in FIG. 12A, in one example, the sensor group includes a temperature sensor. The temperature sensor may be a third TFT 153. The third TFT 153 may include a third drain electrode 1531, a third source electrode 1532, and a third gate electrode 1533. The temperature sensor may be configured to sense the temperature and output a corresponding current signal. The temperature sensor is suitable for a low driving signal.

Figure 12B:
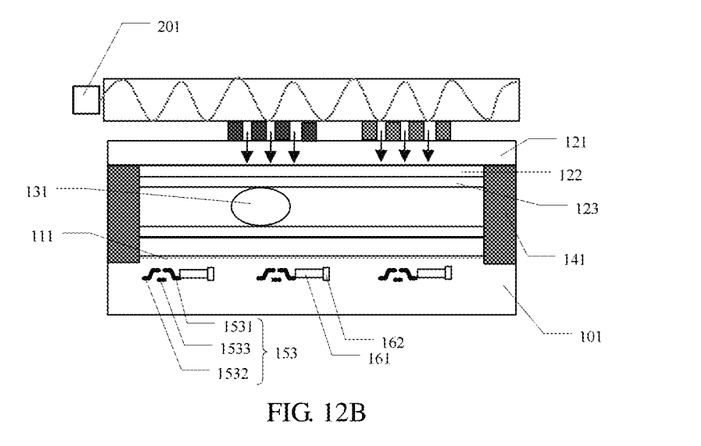
FIG. 12B is a sectional view of a micro-total analysis system according to another example of the present disclosure.

As shown in FIG. 12B, in one example, the temperature sensor may further include a thermistor 161 connected in series with the third TFT 153. One terminal of the thermistor 161 is electrically connected to the third drain electrode 1531, and the other terminal of the thermistor 161 is electrically connected to a reference voltage terminal 162.

For example, the thermistor 161 may replace the third TFT 153 to sense the temperature when the driving signal is a high-voltage signal. For example, when the temperature sensed by the thermistor 161 decreases, the resistance of the thermistor increases, and a sensing current output by the third TFT 153 decreases; and when the temperature sensed by the thermistor 161 increases, the resistance of the thermistor decreases, and the sensing current output by the third TFT 153 increases.

For example, the genetic testing is required to be performed in a stable temperature environment, and the temperature sensor can detect and regulate the temperature of an operating environment in real time.

Figure 13A:
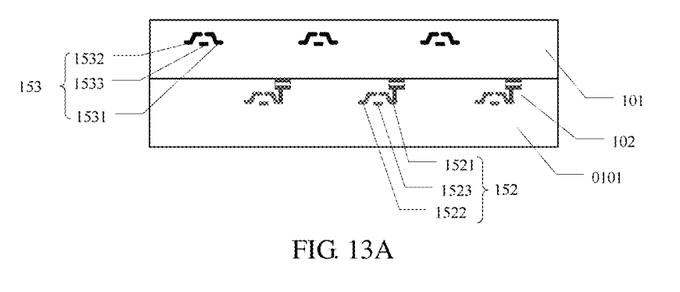
FIG. 13A is a sectional view of a detection unit in a micro-total analysis system according to an example of the present disclosure.
Figure 13B:
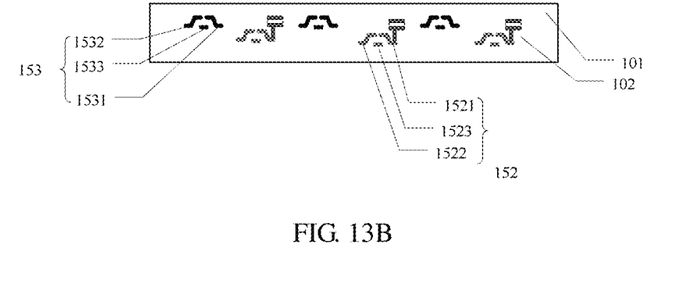
FIG. 13B is a sectional view of a detection unit in a micro-total analysis system according to another example of the present disclosure.

FIG. 13A shows a plurality of sensors which are separately designed and fabricated, with an independent detection structure, simple wirings and driving mode, and high flexibility. FIG. 13B shows a plurality of sensors which are integrated.

Figure 14:
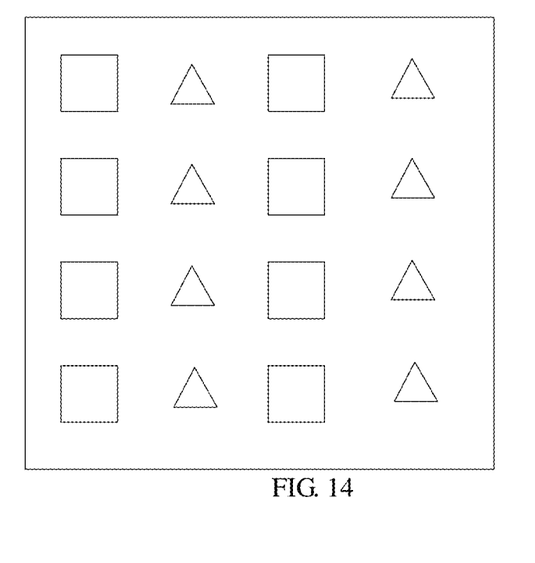
FIG. 14 is a top view of a detection unit in a micro-total analysis system according to an example of the present disclosure.
Figure 15:
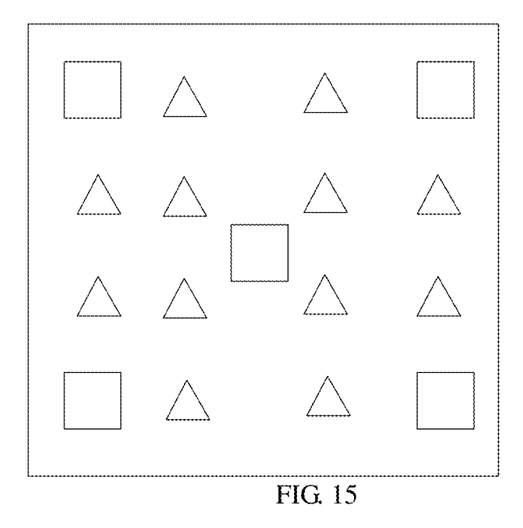
FIG. 15 is a top view of a detection unit in a micro-total analysis system according to another example of the present disclosure.

For example, as shown in FIGS. 14 and 15, different sensors may be distributed uniformly, or arranged selectively based on different requirements.

As shown in FIGS. 14 and 15, in one example, the sensor group includes at least two different types of sensors. The same type of sensor includes a plurality of sensors, and the plurality of sensors of the same type may be arranged uniformly. For example, a square pattern may represent one type of sensor and a triangular pattern may represent another type of sensor. For example, the numbers of different types of sensors may be the same or different. The sensors may be distributed selectively based on application requirements.

An example of the present disclosure provides a micro-total analysis method, including: accommodating a liquid to be detected in a microfluidic device, forming a first light irradiated to the microfluidic device, and detecting the liquid to be detected and outputting a detection signal to obtain detection information.

An example of the present disclosure provides a micro-total analysis method. The microfluidic device includes a first electrode disposed on a first base substrate and a second electrode disposed on a second base substrate, the second electrode is insulated from the first electrode, driving and capacitance detection performed in a time-division mode, and the micro-total analysis method includes: driving the liquid with the first electrode and the second electrode in a first period; and outputting a capacitance signal between the first electrode and the second electrode in a second period.

In the micro-analysis method according to an example of the present disclosure, in the first period, a common signal is input to the second electrode and a first driving signal is input to the first electrode. The micro-total analysis method further includes a step of adjusting the first driving signal in real time based on the result of the capacitance detection.

For example, the micro-total analysis method includes a plurality of time spans TE, each of which includes the first period T1 and the second period T2, and the first period T1 is a driving phase and the second period T2 is a detecting phase. The first driving signal input to the first electrode in a subsequent time span TE may be adjusted in real time according to the result of the capacitance detection in a previous time span TE that before the subsequent time span TE, thereby realizing a real-time adjustment and detection.

For example, the liquid to be detected generates fluorescence under excitation of the first light, and the detection unit is irradiated with the fluorescence and outputs the detection signal according to the fluorescence. Certainly, the detection unit is not limited to detecting the fluorescence. For example, the detection unit may also detect transmitted light transmitting through the liquid to be detected to achieve the detection purpose.

The two above-mentioned examples provide the micro-total analysis method. For details, please refer to the driving method of the capacitive sensor described above, and details are not described herein again.

In the examples of the present disclosure, the optical sensor, the capacitance sensor, and the temperature sensor may be provided with respective TFTs, gate lines, and data lines to reduce the number of leading wires of each type of sensors, but not limited thereto. The detection method may be optical, capacitive, impedance, or the like.

It should be noted that, in order to clearly illustrate, a layer or an area may be amplified in the drawings of the examples of the present disclosure. It is to be understood that, when a member such as a layer, a film, an area or a substrate is located or disposed on or below another member, the member can be located or disposed on or below the another member directly, or an intermediate member or intermediate member(s) can be disposed.

In addition, the features in different examples or different features in the same examples can be combined without conflict.

What have been described above are only specific implementations of the present disclosure, the protection scope of the present disclosure is not limited thereto. Any modifications or substitutions easily occur to those skilled in the art within the technical scope of the present disclosure should be within the protection scope of the present disclosure. Therefore, the protection scope of the present disclosure should be based on the protection scope of the claims.

What is claimed is:

1. A micro-total analysis system, comprising:
   a microfluidic device, configured to accommodate a liquid to be detected;
   an optical unit, configured to form a first light irradiated to the microfluidic device; and
   a detection unit, configured to detect the liquid to be detected and output a detection signal to obtain detection information,
   wherein the microfluidic device comprises a first base substrate and a second base substrate opposite to each other,
   the detection unit is located on a side of the first base substrate close to the second base substrate or on a side of the first base substrate away from the second base substrate, and
   the optical unit is located on a side of the second base substrate away from the first base substrate,
   wherein the microfluidic device comprises a first electrode located on the side of the first base substrate close to the second base substrate, and a second electrode located on a side of the second base substrate close to the first base substrate,
   the first electrode comprises a plurality of first sub-electrodes insulated from each other, each of the plurality of first sub-electrodes is connected with a first thin film transistor,
   wherein an orthographic projection of the optical unit on the first base substrate overlaps with an orthographic projection of the first electrode on the first base substrate,
   the plurality of first sub-electrodes are arranged in an array in a row direction and in a column direction; the second electrode comprises a plurality of second sub-electrodes insulated from each other, an orthographic projection of each of the plurality of second sub-electrodes on the first base substrate overlaps with an orthographic projection of a row of the first sub-electrodes on the first base substrate, the plurality of second sub-electrodes are arranged in the column direction, and each of the plurality of second sub-electrodes extends in the row direction,
   any two adjacent ones of the plurality of first sub-electrodes arranged in the row direction have a first interval, any two adjacent ones of the plurality of first sub-electrodes arranged in the column direction have a second interval, and any two adjacent ones of the plurality of second sub-electrodes are provided with a third interval.

2. The micro-total analysis system according to claim 1, wherein a space between the first base substrate and second base substrate is configured to accommodate the liquid to be detected.

3. The micro-total analysis system according to claim 1, wherein the optical unit comprises a light source, a light guide plate, and a grating,
the light guide plate is opposite to the second base substrate, the light source is located on a side surface of the light guide plate, the grating is located on a side of the light guide plate close to the first base substrate,
the light source is configured to emit a second light, the light guide plate is configured to transmit the second light, and the grating is configured to adjust the second light transmitted from the light guide plate to the first light, and emit the first light toward the microfluidic device.

4. The micro-total analysis system according to claim 3, wherein the light source comprises a laser light source.

5. The micro-total analysis system according to claim 3, wherein the grating comprises a first grating portion and a second grating portion,
the first grating portion and the second grating portion are configured to form the first light being different in a feature, and the feature comprises at least one of wavelength and intensity.

6. The micro-total analysis system according to claim 3, wherein the second base substrate is also taken as the light guide plate.

7. The micro-total analysis system according to claim 1, wherein the detection unit comprises a sensor group.

8. The micro-total analysis system according to claim 7, wherein the sensor group comprises an optical sensor, the optical sensor is configured to detect a third light, and the third light is a light transmitted to the optical sensor after the first light passing through the liquid to be detected.

9. The micro-total analysis system according to claim 8, wherein the third light is a fluorescence emitted by the liquid to be detected under an excitation of the first light.

10. The micro-total analysis system according to claim 7, wherein the sensor group comprises a plurality of second thin film transistors and a plurality of photosensitive diodes,
each of the plurality of photosensitive diodes is respectively connected with one of the plurality of second thin film transistors, the plurality of second thin film transistors are arranged in an array,
second thin film transistors in a same row are connected to a same gate line, and second thin film transistors in a same column are connected to a same data line.

11. The micro-total analysis system according to claim 10, wherein the sensor group comprises a capacitive sensor;
the microfluidic device comprises the first electrode on the first base substrate, and the second electrode on the second base substrate, the second electrode is insulated from the first electrode,
the first electrode and the second electrode are configured to drive the liquid to be detected in a first period, and configured to output a capacitance signal between the first electrode and the second electrode in a second period, and
the first electrode and the second electrode constitute the capacitive sensor.

12. The micro-total analysis system according to claim 11, wherein each of the second sub-electrodes and a corresponding one row of the first sub-electrodes have an overlapping portion in a direction perpendicular to the first base substrate.

13. The micro-total analysis system according to claim 7, wherein the sensor group comprises at least two different types of sensors, a same type of sensors comprises a plurality of sensors, and the plurality of sensors of the same type are arranged uniformly.

14. A micro-total analysis method, comprising:
accommodating a liquid to be detected in a microfluidic device;
forming a first light irradiated to the microfluidic device; and
detecting the liquid to be detected and outputting a detection signal to obtain detection information,
wherein the microfluidic device comprises a first base substrate and a second base substrate opposite to each other,
the detection unit is located on a side of the first base substrate close to the second base substrate or on a side of the first base substrate away from the second base substrate, and
the optical unit is located on a side of the second base substrate away from the first base substrate,
wherein the microfluidic device comprises a first electrode located on the side of the first base substrate close to the second base substrate, and a second electrode located on a side of the second base substrate close to the first base substrate,
the first electrode comprises a plurality of first sub-electrodes insulated from each other, each of the plurality of first sub-electrodes is connected with a first thin film transistor,
wherein an orthographic projection of the optical unit on the first base substrate overlaps with an orthographic projection of the first electrode on the first base substrate,
the plurality of first sub-electrodes are arranged in an array in a row direction and in a column direction; the second electrode comprises a plurality of second sub-electrodes insulated from each other, an orthographic projection of each of the plurality of second sub-electrodes on the first base substrate overlaps with an orthographic projection of a row of the first sub-electrodes on the first base substrate, the plurality of second sub-electrodes are arranged in the column direction, and each of the plurality of second sub-electrodes extends in the row direction,
any two adjacent ones of the plurality of first sub-electrodes arranged in the row direction have a first interval, any two adjacent ones of the plurality of first sub-electrodes arranged in the column direction have a second interval, and any two adjacent ones of the plurality of second sub-electrodes are provided with a third interval.

15. The micro-total analysis method according to claim 14, wherein the liquid to be detected generates fluorescence under excitation of the first light, and the detection unit is irradiated with the fluorescence and outputs the detection signal according to the fluorescence.

16. The micro-total analysis method according to claim 14, wherein the microfluidic device comprises the first electrode on a side of a first base substrate close to a second base substrate and the second electrode on a side of the second base substrate close to the first base substrate, the second electrode is insulated from the first electrode, the first base substrate and the second base substrate are opposite to each other, driving and capacitance detection are performed in a time-division mode, and the micro-total analysis method comprises:

driving the liquid to move by using the first electrode and the second electrode in a first period; and outputting a capacitance signal between the first electrode and the second electrode in a second period.

17. The micro-total analysis method according to claim 16, wherein, in the first period, a common signal is input to the second electrode and a first driving signal is input to the first electrode, and the micro-total analysis method further comprises adjusting the first driving signal in real time based on a result of the capacitance detection.

18. The micro-total analysis method according to claim 17, comprising a plurality of time spans, wherein each of the plurality of time spans comprises the first period and the second period, and the first driving signal input to the first electrode in a subsequent time span is adjusted in real time according to the result of the capacitance detection in a previous time span that before the subsequent time span.

19. The micro-total analysis method according to claim 17, wherein the first driving signal has a frequency greater than a resonance frequency of droplets formed by dividing the liquid to be detected and less than a charging frequency of the microfluidic device.

20. A micro-total analysis system, comprising:

a microfluidic device, configured to accommodate a liquid to be detected;

an optical unit, configured to form a first light irradiated to the microfluidic device; and a detection unit, configured to detect the liquid to be detected and output a detection signal to obtain detection information, wherein the microfluidic device comprises a first base substrate and a second base substrate opposite to each other, the detection unit is located on a side of the first base substrate close to the second base substrate or on a side of the first base substrate away from the second base substrate, and the optical unit is located on a side of the second base substrate away from the first base substrate, wherein the microfluidic device comprises a first electrode located on the side of the first base substrate close to the second base substrate, and a second electrode located on a side of the second base substrate close to the first base substrate, the first electrode comprises a plurality of first sub-electrodes insulated from each other, each of the plurality of first sub-electrodes is connected with a first thin film transistor, and a space between the first base substrate and second base substrate is configured to accommodate the liquid to be detected, wherein the plurality of first sub-electrodes are arranged in an array in a row direction and in a column direction; the second electrode comprises a plurality of second sub-electrodes insulated from each other, an orthographic projection of each of the plurality of second sub-electrodes on the first base substrate overlaps with an orthographic projection of a row of the first sub-electrodes on the first base substrate, the plurality of second sub-electrodes are arranged in the column direction, and each of the plurality of second sub-electrodes extends in the row direction, any two adjacent ones of the plurality of first sub-electrodes arranged in the row direction are spaced apart from each other, any two adjacent ones of the plurality of first sub-electrodes arranged in the column direction are spaced apart from each other, and any two adjacent ones of the plurality of second sub-electrodes are spaced apart from each other.

* * * * *